Dec. 9, 1941.  G. H. WILLIAMS  2,265,502
CLUTCH MECHANISM
Filed May 13, 1939  3 Sheets-Sheet 1

INVENTOR.
GLYNN H. WILLIAMS
BY Harold W. Mattingly
ATTORNEY.

Dec. 9, 1941.    G. H. WILLIAMS    2,265,502
CLUTCH MECHANISM
Filed May 13, 1939    3 Sheets-Sheet 2

INVENTOR.
GLYNN H. WILLIAMS
BY Harold W. Mattingly
ATTORNEY.

Dec. 9, 1941.   G. H. WILLIAMS   2,265,502
CLUTCH MECHANISM
Filed May 13, 1939   3 Sheets-Sheet 3
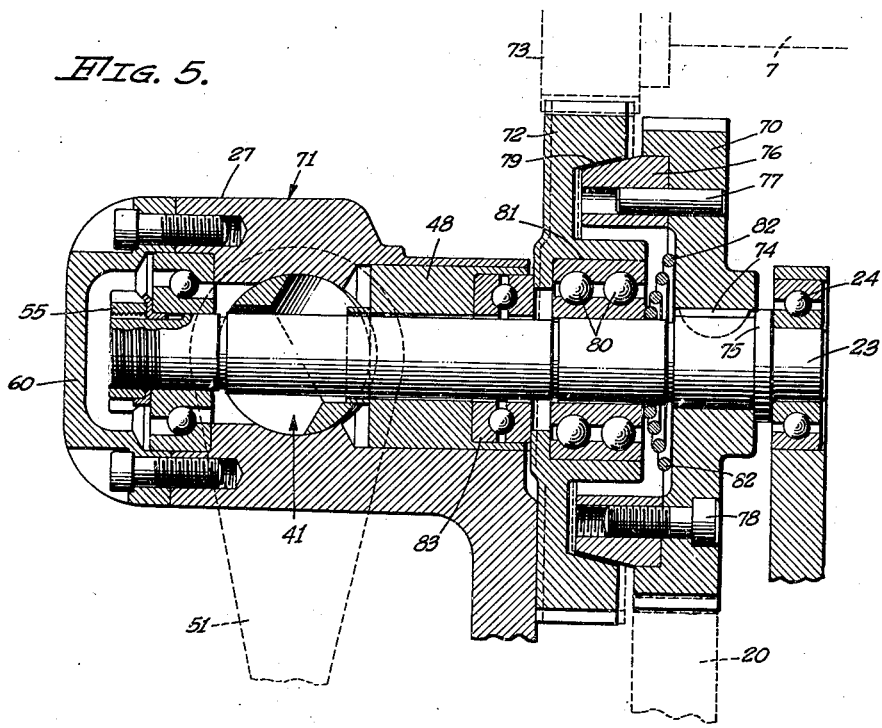
FIG. 5.
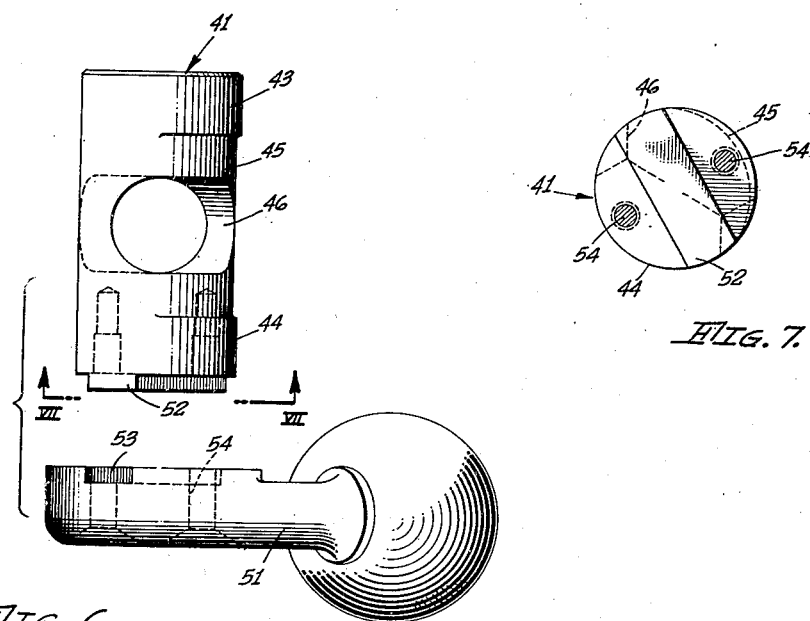
FIG. 6.
FIG. 7.
INVENTOR.
GLYNN H. WILLIAMS
BY Harold W. Mattingly
ATTORNEY.

Patented Dec. 9, 1941

2,265,502

UNITED STATES PATENT OFFICE 2,265,502

CLUTCH MECHANISM

Glynn H. Williams, Huntington Park, Calif., assignor to Axelson Manufacturing Co., Los Angeles, Calif., a corporation of California Application May 13, 1939, Serial No. 273,480

13 Claims. (Cl. 192—93)

My invention relates to a clutch mechanism and has particular reference to a clutch mechanism which finds particular utility when employed to control the feeding devices for machine tool carriages and the like.

Clutch mechanisms of various types have long been employed on the carriages of machine tools such as lathes and milling machines to control the feeding of the carriage relative to the workpiece mounted on the machine tool mandrel. The most common machine tool employing clutches for this purpose is the engine lathe in which a clutch is used for controlling the "traverse feed" or the automatic feeding of the carriage longitudinally of the lathe bed and a similar mechanism is employed to control the "cross feed" or the automatic feeding of the tool post transversely of the bed.

The clutches of this type which are in common use are subject to rapid wear which results from dust or other abrasive materials inadvertently getting into the working parts and from inadequate operating mechanisms which, unless skillfully operated, may place an undue strain on the working parts. These clutches accordingly very soon get out of adjustment and with the types of construction employed it is a major repair operation to readjust the spacing between the clutching elements so as to re-establish the proper operating conditions. These clutch mechanisms are usually of relatively frail construction and employ elementary bearings for supporting the rotating parts so that undue friction is present during the operation of these devices tending to cause these devices to rapidly wear out.

It is therefore an object of my invention to provide a clutch mechanism for machine tools which includes a means for readily and easily adjusting the relative spacing of the clutching elements to compensate for wear thereof and thereby avoid some of the aforementioned disadvantages.

It is also an object of my invention to provide a clutch of the character set forth in the preceding paragraph which is totally enclosed except for an operable control means therefor so that longer life, trouble free operation is obtained through the exclusion of dust and similar abrasive materials.

It is a further object of my invention to provide in a clutch of the character set forth in the preceding paragraphs an improved bearing construction for supporting the rotating parts and an improved arrangement of parts permitting a sturdy, rigid assembly of these parts so as to minimize the wear and liability of breakage.

The mechanism which is employed for engaging and disengaging the clutches in current use has no positive stops in the full "off" position to prevent overthrow of the operating mechanism, with the result that, unless skillfully handled, these mechanisms may be operated in such manner as to damage or destroy the clutch parts. These mechanisms are usually of the lever type and mounted for rotary movement in a plane parallel to the carriage apron so that it is not unusual for these mechanisms to be operated to engage the clutches accidentally at a time when such engagement results in the ruination of a partly completed machining operation. These mechanisms are usually arranged in such fashion that the force required to engage and disengage the clutch is applied in a sidewise fashion to the counter-shafts employed and associated therewith so that repeated operations of the clutch device tend to distort these shafts and cause undue wear of the bearings and gears associated therewith. The clutch mechanisms employed are so arranged that the gears are mounted in an over-hung fashion relative to the bearings supporting the shafts upon which the gears are secured. This also results in undue wear on the bearings and, as a result thereof, improper meshing of the gears to cause rough and unsatisfactory operation of the devices.

It is therefore an additional object of my invention to provide a control mechanism for a clutch of the character set forth hereinbefore which is positioned for operation relative to the carriage with which it is associated in such a manner as to reduce to a minimum the liability of inadvertent or accidental operation thereof.

It is also an object of my invention to provide a control mechanism of the character set forth in the preceding paragraph which employs a novel cam construction to apply engaging or disengaging forces to a clutch mechanism in such fashion that these forces are not applied in a sidewise manner to the countershafts forming a part of the carriage mechanism.

It is an additional object of my invention to arrange the clutch elements, the countershafts and the gears supported thereby associated with a clutch mechanism of the character set forth in the preceding paragraphs in such fashion that the gears are disposed between bearings in contra-distinction to the overhung type of bearing supports.

Other objects and advantages of my invention will be apparent from a study of the following specifications, read in connection with the accompanying drawings, wherein:

Fig. 5 is a fragmentary vertical section similar to Fig. 3 but taken on the line V—V of Fig. 1 to show an alternative type of construction which finds particular utility when employed for controlling the "cross feed";

Fig. 6 illustrates in oblique projection the cam employed in the clutch mechanism and a control handle therefor; and Fig. 7 is an elevation taken substantially along the line VII—VII of Fig. 6 to illustrate the manner in which the handle is secured to the cam.

For the sake of teaching the construction and operation of the clutch mechanism of my invention, I have illustrated the preferred embodiment thereof as adapted to and installed on a carriage for an engine lathe for controlling the "traverse feed" of the carriage, together with an alternative type for controlling the "cross feed" thereof.

Figure 1:
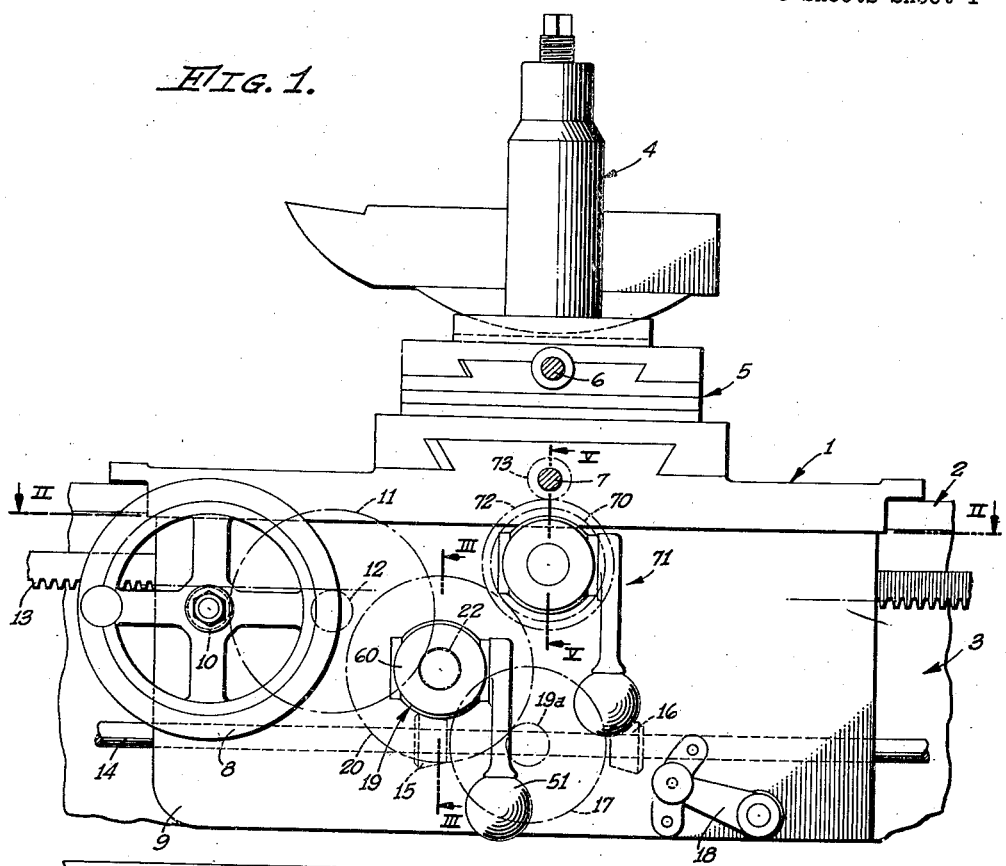
Fig. 1 is an elevation illustrating the appearance of a carriage for an engine lathe equipped with clutch mechanisms of my invention for controlling the "traverse" and "cross feeds" thereof.
Figure 2:
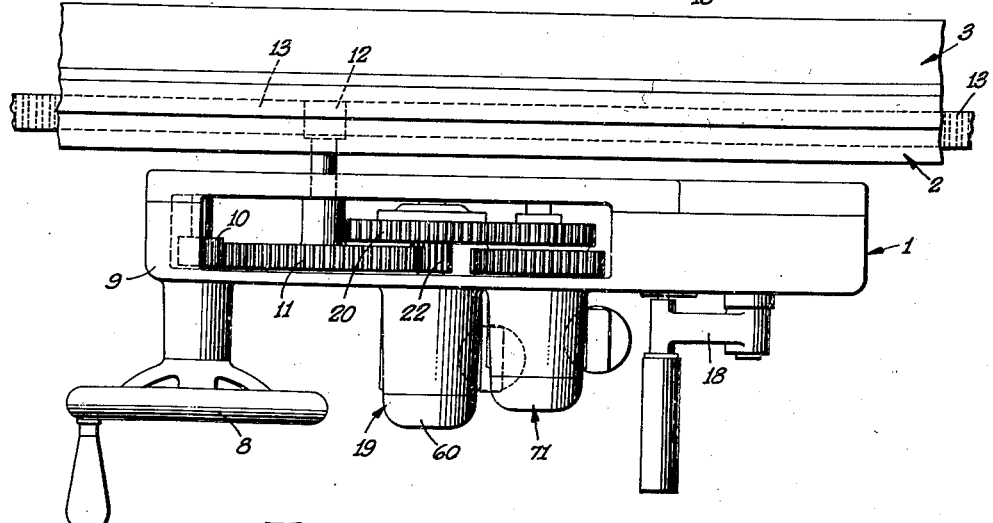
Fig. 2 is a horizontal section of the carriage illustrated in Fig. 1 taken substantially along the line II—II thereof to illustrate the appearance of the clutch mechanisms of my invention and one arrangement of a gear train associated therewith.

Referring to the drawings, I have illustrated in Fig. 1 a carriage 1 of a conventional type of engine lathe which is mounted for slidable movement along ways 2 forming a part of a lathe bed 3. A tool post 4 is mounted for slidable movement on a compound rest 5, such slidable movement being controlled by means of a compound feed screw 6. The compound rest 5 is also mounted for slidable movement transversely of the bed 3 upon the upper portion of the carriage 1 and may be so moved through the use of a "cross feed" screw 7. Slidable movement of the carriage 1 longitudinally to the bed 3 may be accomplished by employing a "traverse feed" wheel 8 which is supported for rotation in an apron portion 9 of the carriage 1 and arranged to rotate a pinion 10.

The pinion 10 engages a driven gear 11 and the driven gear 11 is coupled to a feed pinion 12 disposed in a position engaging a gear rack 13 secured to the underside of the upper portion of the lathe bed 3. Rotation of the "traverse feed" wheel 8 will cause a rotation of the feed pinion 12 and advance this pinion and the carriage 1 secured thereto longitudinally along the ways 2.

The carriage 1 may also be moved longitudinally along the bed 3 by power means, power for this operation being derived from a drive shaft 14 which extends longitudinally of the bed 3 and is arranged to be driven by a suitable power source (not shown). Power from the drive shaft 14 may be transmitted to the load through the driven gear 11, so as to cause feeding of the carriage through rotation of this gear, by means of a gear train which includes a pair of bevel gears 15 and 16 slidable on the shaft 14. The drive shaft 14 is supplied or provided with splines or a keyway (not shown) extending its full length and the gears 15 and 16 are provided with a suitable feather or splining to fit in the corresponding provision on the drive shaft 14 so that these gears may be slidably moved longitudinally of the drive shafts 14 but are restrained against rotation relative thereto.

A ring gear 17 is rotatably supported from the apron 9 in a position to be engaged by one or the other of the bevel gears 15 or 16, the engagement of these gears being controlled by a shifting lever 18 and suitable mechanism (not shown) interconnecting this lever and each of the gears 15 and 16.

The ring gear 17 is preferably coupled to the driven gear 11 through a clutch mechanism 19 and accordingly may be of the compound type and provided with a drive pinion 19a which is meshed with a main drive gear 20. The main drive gear 20 is secured to one of the interengageable parts of the clutch mechanism 19, the associated part of which is secured to a driven pinion 22 disposed in a position engaging the previously mentioned driven gear 11. It follows that movement of the shift lever 18 to a position causing one or the other of the bevel gears 15 or 16 to engage the ring 17 will cause the transmission of rotary power from the drive shaft 14 to the main drive gear 20 and that inter-engagement of the related parts of the clutch mechanism 19 will cause rotation of the driven pinion 22 therewith so that rotation of this pinion will cause the carriage 1 to be moved along the lathe bed 3 through the interaction between the feed pinion 12 and the gear rack 13.

The direction of this longitudinal feeding may be controlled by means of the shift lever 18 shifting one or the other of the bevel gears 15 or 16 into mesh with the ring gear 17, engagement of the bevel gear 15 with the ring gear 17 causing a feeding movement in one direction and the engagement of the bevel gear 16 with the ring gear 17 causing feeding of the carriage in the opposite direction.

Figure 3:
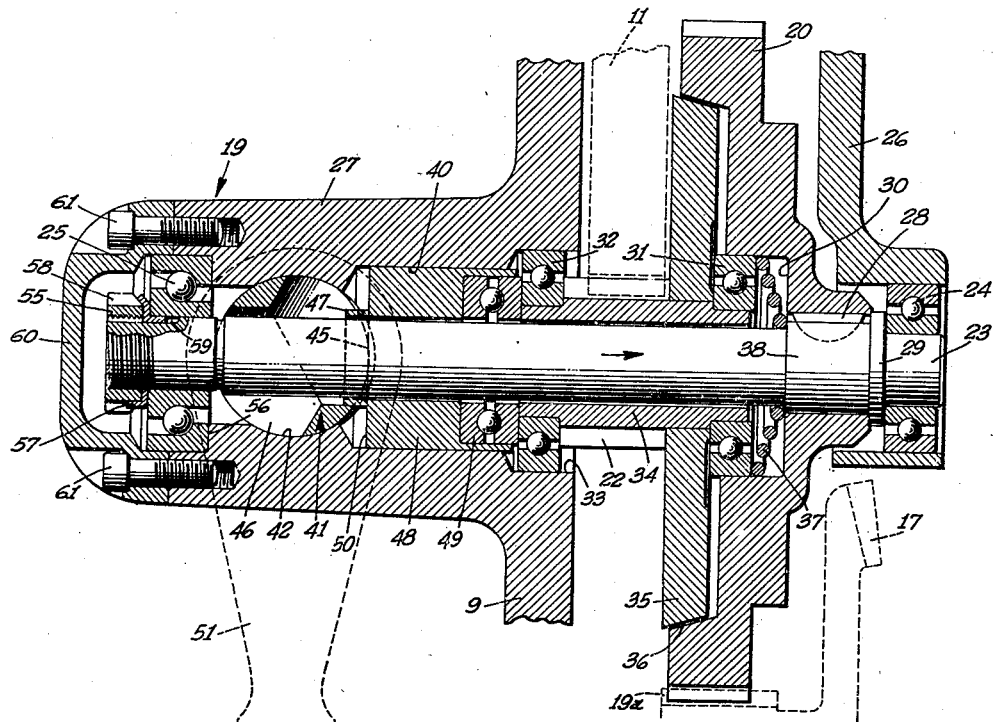
Fig. 3 is a fragmentary vertical section taken substantially along the line III—III of Fig. 1 and illustrating the details of construction of the clutch mechanism and relative positions of the parts when the clutch is in the disengaged position.

I have illustrated in Fig. 3 the details of construction of the preferred embodiment of the clutch mechanism 19 as including a clutch shaft 23 supported for rotation in ball bearings 24 and 25 carried respectively by a flange portion 26 of the carriage 1 and a housing portion 27 formed on the apron 9 of the carriage. The previously described main drive gear 20 may be secured to the shaft 23 as by means of a key or feather 28 and restrained against longitudinal sliding movement along the shaft 23 in any suitable manner as by means of a flange portion 29 formed on the shaft 23.

The hub of the main drive gear 20 is provided with an annular recess 30 adapted to slidably receive the outer race of a ball bearing 31 which cooperates with a similar ball bearing 32 slidably supported in a recess 33 formed in the housing 27 to rotatably support a clutch sleeve 34 upon which the driven pinion 22 may be non-rotatably secured. The bore of the sleeve 34 is preferably made sufficiently large to provide an air space between the shaft 23 and the sleeve 34 so that rotation of the shaft 23, caused by rotation of the main drive gear 20, will not tend to rotate the sleeve 34 and the driven pinion 22 secured thereto through frictional engagement between the shaft 23 and the bore of the sleeve 34.

A cone clutch member 35 is preferably non-rotatably secured to one end of the clutch sleeve 34 in a position to enter a similarly conically shaped recess or clutch element 36 provided in the body of the main drive gear 20. It will be seen that should the cone clutch member 35 be urged to the right, as viewed in Fig. 3, to bring it into engagement with the conical shaped recess 36, the driven pinion 22 and the main drive gear 20 would be drivably engaged with each other.

In order to prevent movement of these members when the clutch is in the disengaged position, I provide a conical, helical spring 37 in a position engaging an enlarged portion 38 of the shaft 23 and the outer race of the ball bearing 31, neither of which rotates relative to the other. The spring 37 is of the compression type and urges the ball bearing 31 and the pinion 22 and the cone clutch member 35 associated therewith to the left, as viewed in Fig. 3, to disengage the clutch member 35 from the cone recess 36.

I also provide a clutch operating mechanism for positively moving the sleeve 34 and the clutch member 35 carried thereby into drivable engagement with the main drive gear 20. This mechanism may include a cam member 41 which is rotatably received in a bore 42 disposed transversely to the left of the bore 33 as viewed in Fig. 3.

As best shown in Figs. 3 and 6, the cam member 41 is cylindrical in shape and is provided at its extremities with bearing surfaces 43 and 44 and disposed between them is a camming surface 45. The camming surface 45 is also preferably of cylindrical shape but disposed eccentrically relative to the cylindrical body portion of the cam member 41. The cam member 41 is also provided with an elongated recess or aperture 46 adapted to receive the shaft 23 and a stop or plug portion 47 of a clutch operator 48. The clutch operator 48 is slidably mounted in a bore 40 coaxial with the bore 33 and coupled to transmit an endwise thrust to the clutch sleeve 34 by means of a ball thrust bearing 49 interposed between the clutch operator 48 and the end of said sleeve. The clutch operator 48 is provided with a cam engaging surface 50 disposed in a position to rest upon the camming surface 45.

Figure 4:
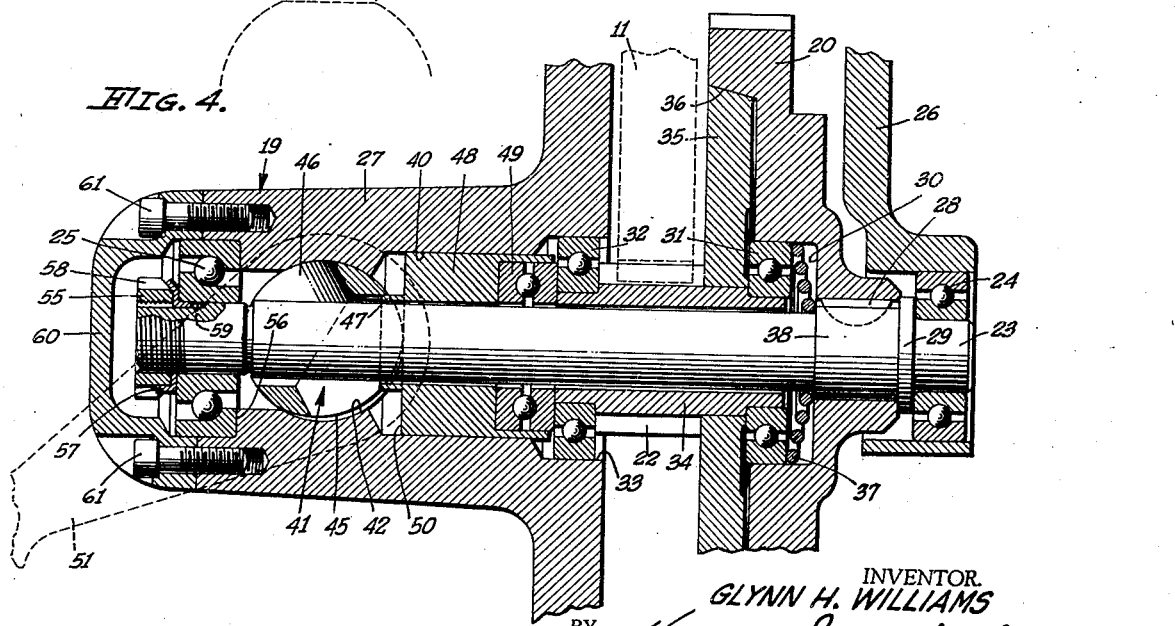
Fig. 4 is a view similar to Fig. 3 but illustrating the parts in the engaged position.

It will be observed by comparing Figs. 3 and 4 that rotation of the cam member 41 will, because of the eccentricity of the camming surface 45 relative to the axis of rotation of the body portion of the cam member 41, move the clutch operator 48 to the right and cause a similar simultaneous movement of the cone clutch member 35 so as to cause engagement between the cone clutch member 35 and the conical recess 36 provided therefor, while a reverse rotation thereof, namely, from the position illustrated in Fig. 4 to the position illustrated in Fig. 3, will allow the compression spring to force the cone clutch member 35 out of engagement with the main drive gear 20. The movement of the clutch mechanism from the disengaged position, illustrated in Fig. 3, to the engaged position, illustrated in Fig. 4, is permitted by allowing the outer races of the bearings 31 and 32 to slide in their respective recesses 30 and 33.

It will be observed by reference to Figs. 3 and 4 and 6 that engagement of the plug portion 47 with the end of the aperture 46 will provide a positive stop for the travel of the cam member 41 in the disengaged position to prevent overthrow of said clutch mechanism and that the engagement of the plug member 47 with the sides of this aperture will restrain the cam member 41 in its bore against slidable movement transversely of the clutch shaft 23. I have, by disposing the cam member 41 and operator 48 in the same plane as the shaft 23 but supported and operated independently thereof, eliminated all sidewise or bending forces which would normally tend to deflect the shaft 23 and cause undue wear of the gears and bearings.

While rotation of the cam member to operate the clutch may be accomplished by any suitable power or manual means, I have illustrated herein a manual control comprising a clutch lever 51 which may be attached to the cam member 41 by the inter-engagement of a rectangular boss 52 formed on one end of the cam member 41 and a complementary recess 53 therefor formed in the handle member 51 (see Fig. 6). The engagement between the boss 52 and the recess 53 may be maintained by means of suitable screws 54 or other securing devices inter-engaging the handle 51 and the cam member 41.

I prefer to arrange the angular position of the clutch lever 51 relative to the cam member 41 such that the lever 51 will occupy a substantially vertical position lying closely adjacent the apron 9 when the clutch is in the disengaged position so as to reduce to a minimum the danger of accidental engagement of the clutch. Furthermore, since such accidental operation would ordinarily occur through a downward movement of a falling object or under similar conditions, I have so arranged the mechanism that an upward and outward movement of the lever 51 is required to engage the clutch and have by this means entirely obviated the danger of accidental operation.

The endwise thrust on the shaft 23 resulting from the operation of engaging the clutch may be transmitted to the apron 9 by means of the previously described ball bearing 25. For this purpose an adjusting nut 55 is threadedly engaged with the outer end of the shaft 23 in a position to bear against the inner race of the ball bearing 25, the outer race of which is secured against endwise movement to the right, as viewed in Fig. 3, by means of a shoulder portion 56 of the recess in which said outer race is retained. Accidental rotation of the nut 55 may be prevented by the employment of a locking ring or lock washer 57 inter-engaging flutes 58 or similar irregularities in the nut 55 and a keyway 59 provided in the end of the shaft 23.

It has been found that after a great many operations, wear of the clutching faces may progress to a point where proper drivable engagement between the cone clutch member 35 and the drive gear 20 is no longer achieved. The nut 55 which is used to secure the bearing 25 to the end of the shaft 23 may be used to adjust the spacing between these members so that when this condition arises the spacing between these members may be reduced to restore the proper operating condition of the clutch mechanism. This adjustment may be obtained by releasing the nut 55 from the lock ring 57 and rotating the nut in a direction to move the shaft 23 to the left, as viewed in Fig. 3, relative to the bearing 25. The leftward movement of the shaft 23 will also move the main drive gear 20 carried thereby to the left to reduce the spacing between said gear and the cone clutch member 35, such slidable movement being permitted by a sliding fit provided for the outer race of the ball bearing 24. This adjusting mechanism may be enclosed and protected by means of a dustcap 60 secured to the end of the boss 27 by readily and easily removable securing means 61 inter-engaging the cap 60 and the boss 27.

I have illustrated in Fig. 5 an alternative form of the clutch mechanism of my invention which is particularly adapted for the operation of the "cross feed" 7. As best shown in Fig. 1, power for operating the "cross feed" 7 may be derived from the main drive gear 20 by providing a "cross feed" drive gear 70 rotatably supported on the carriage 1 in engagement with the main drive gear 20 and associated with one half of a "cross feed" clutch mechanism 71. The other half of the clutch mechanism 71 may be connected to a "cross feed" driven gear 72 which in turn meshes with a "cross feed" pinion 73 secured to the "cross feed" lead screw 7.

As illustrated in Fig. 5 the clutch mechanism 71 is very similar to the clutch mechanism 19 previously described including the housing or boss 27 in which is mounted the cam member 41 and clutch operator 48 associated therewith. The clutch shaft 23 is also included in this mechanism and fitted with the adjusting nut 55 and enclosed by the dustcap 60.

The "cross feed" drive gear 70 is secured to the shaft 23 as by means of a key 74 or other suitable securing means and held against longitudinal movement therealong by means of a flange portion 75 on the shaft 23. The leftward face of the gear 70, as viewed in Fig. 5, may be provided with a cone clutch member 76 secured thereto as by means of dowel pins 77 and clamping screws 78. The cone clutch member 76 is adapted to engage a clutch recess 79 provided in the body of the "cross feed" driven gear 72.

The gear 72 is rotatably supported on the clutch shaft 23 by means of a ball bearing 80. The outer race of the ball bearing 80 is received in a recess 81 formed in the hub of the gear 72, while the inner race thereof is slidably supported on the shaft 23. A compression spring 82 is interposed between the inner race of the ball bearing 80 and the hub of the "cross feed" drive gear 70 so as to urge the ball bearing 80 and the driven gear 72 associated therewith away from the cone clutch member 76.

Movement of the clutch operator 48 to cause engagement between the cone clutch member 76 and the driven gear 72 may be transmitted to the gear 72 by means of a ball thrust bearing 83 secured to the clutch operator 48 in a position to bear against one face of the gear 72. Movement of the clutch operator 48 to the right, as viewed in Fig. 5, as a result of operating the handle member 51 to cause rotation of the cam member 41, will in this fashion move the gear 72 to the right and cause engagement between the clutch face 79 and the cone clutch member 76 to drivably interconnect the gears 70 and 72. A reverse operation of the handle 51 will allow the compression spring 82 to slide the bearing 80, the gear 72 and the clutch operator 48 on the shaft to cause disengagement of the clutch mechanism.

It will be observed from the foregoing explanation that the clutch mechanism of my invention is particularly adapted for use on machine tools and that the handle or lever for operating the clutch is disposed in such position that the danger of accidental engagement of the clutch is reduced to a minimum. Furthermore, adjustment of the spacing between the cooperating clutch elements is easily obtained through use of the adjusting nut provided for that purpose. The entire mechanism is enclosed so as to be protected against dust or other abrasive materials and the entire construction is arranged in such fashion that all gears and similar devices are supported between bearings, all overhung types of construction being avoided.

While I have shown and described the preferred and alternative embodiments of my invention as comprising clutch mechanisms used for controlling the "traverse" and "cross feed" of an engine lathe, it will be apparent to those skilled in the art that these clutches will find great utility when used with other types of machine tools and that a clutch mechanism of this type may also be found to possess advantages when employed for drivably engaging or disengaging two rotary members irrespective of whether these members are associated with machine tools or not, and I do not desire to be limited to any of the details of construction shown or described herein, except as defined in the appended claims.

I claim:

1. In a clutch mechanism, the combination of: a clutch element drivably engaged with a power source; a clutch member drivably engaged with a load to be connected to said power source; means mounting said clutch member and said clutch element for movement relative to each other from a disengaged position to an engaged position drivably connecting together said clutch member and said clutch element; a clutch operator mounted for slidable movement into engagement with said clutch member for moving said member and said element into engagement with each other; a rotatable cam device for sliding said clutch operator; means mounting said cam device for rotation; a camming surface carried by said cam device in a position engaging said clutch operator and comprising a cylindrical surface eccentrically disposed relative to the axis of rotation of said cam device; means for rotating said cam device; stop means carried by said operator; and elongated recess means in said cam device for receiving said stop means, said recess means being so disposed as to cause engagement between an end thereof and said stop means when said cam device is rotated to a position corresponding to said disengaged position of said clutch mechanism.

2. In a clutch mechanism, the combination of: a clutch housing; a clutch element drivably engaged with a power source; shaft means mounted for rotation in said housing for supporting said clutch element in a fixed position relative to said housing; a clutch member drivably engaged with a load to be connected to said power source; means mounting said member in said housing co-axially with said shaft means for independent rotation relative thereto; means mounting said clutch member and said clutch element for slidable movement relative to each other from a disengaged position to an engaged position drivably connecting together said clutch member and said clutch element; spring means interposed between said clutch member and said clutch element for normally urging said member and said element out of engagement with each other; a clutch operator slidably mounted in said housing co-axially with said shaft and independently thereof for engaging said clutch member and sliding said member and said element into engagement with each other; a cam device supported for rotation by said housing for sliding said clutch operator; and means for rotating said cam device.

3. In a clutch mechanism, the combination of: a clutch element drivably engaged with a power source; a clutch member drivably engaged with a load to be connected to said power source; means mounting said clutch member and said clutch element for movement relative to each other from a disengaged position to an engaged position drivably connecting together said clutch member and said clutch element; spring means interposed between said clutch member and said clutch element for normally urging said member and said element out of engagement with each other; a clutch operator mounted for slidable movement into engagement with said clutch member for moving said member and said element into engagement with each other; a rotatable cam device for sliding said clutch operator; means mounting said cam device for rotation; means for rotating said cam device; means for adjusting the position of said element relative to said cam device to adjust the position of said member relative to said element in said disengaged position, a camming surface carried by said cam device in a position engaging said clutch operator and comprising a cylindrical surface eccentrically disposed relative to the axis of rotation of said cam device; plug means carried by said operator; and elongated recess means in said cam device for receiving said plug means, said recess means being so disposed as to cause engagement between an end thereof and said plug means when said cam device is rotated to a position corresponding to said disengaged position of said clutch mechanism.

4. In a clutch mechanism, the combination of: a clutch housing; a clutch element drivably engaged with a power source; shaft means mounted for rotation in said housing for supporting said clutch element in a fixed position relative to said housing; a clutch member drivably engaged with a load to be connected to said power source; means mounting said member in said housing co-axially with said shaft means for independent rotation relative thereto; means mounting said clutch member and said clutch element for slidable movement relative to each other from a disengaged position to an engaged position drivably connecting together said clutch member and said clutch element; spring means interposed between said clutch member and said clutch element for normally urging said member and said element out of engagement with each other; a clutch operator mounted co-axially with said shaft for slidable movement in said housing independently of said shaft into engagement with said clutch member for sliding said member and said element into engagement with each other; a rotatable cam device for sliding said clutch operator; means mounting said cam device in said housing for rotation about an axis disposed transversely of said shaft means; means for rotating said cam device; a camming surface carried by said cam device in a position engaging said clutch operator and comprising a cylindrical surface eccentrically disposed relative to the axis of rotation of said cam device; and means inter-engaging said shaft and said housing for moving said shaft in said housing to adjust the position of said element relative to said cam device for adjusting the relative positions of said member and said element in said disengaged position.

5. In a clutch mechanism, the combination of: a clutch element drivably engaged with a power source; a clutch member drivably engaged with a load to be connected to said power source; shaft means mounting said clutch member and said clutch element for movement relative to each other from a disengaged position to an engaged position drivably connecting together said clutch member and said clutch element; a rotatable cam device for moving said member and said element into engagement with each other; means mounting said cam device independently of said shaft for rotation about an axis disposed transversely of and intersecting said shaft means intermediately of the ends thereof; means for rotating said cam device; and aperture means in said cam device for receiving said shaft means to permit rotation of said cam device.

6. In a clutch mechanism, the combination of: a clutch element drivably engaged with a power source; a clutch member drivably engaged with a load to be connected to said power source; shaft means mounting said clutch member and said clutch element for movement relative to each other from a disengaged position to an engaged position drivably connecting together said clutch member and said clutch element; a clutch operator mounted for slidable movement into engagement with said clutch member for moving said member and said element into engagement with each other; stop means carried by said operator; a rotatable cam device having a camming face engaging said clutch operator for sliding said operator into engagement with said member; means mounting said cam device for rotation with its axis disposed transversely of and intersecting said shaft means intermediately of the ends thereof; means for rotating said cam device; and elongated aperture means in said cam device for receiving said shaft means and said stop means to permit rotation of said cam device, said aperture means being so disposed as to cause engagement between an end thereof and said stop means when said cam device is rotated to a position corresponding to said disengaged position of said clutch mechanism.

7. In a clutch mechanism, the combination of: a housing; a clutch element in said housing drivably engaged with a power source; a clutch member in said housing drivably engaged with a load to be connected to said power source; means mounting said clutch member and said clutch element for movement relative to each other from a disengaged position to an engaged position drivably connecting together said clutch member and said clutch element; spring means interposed between said clutch member and said clutch element for normally urging said clutch member and said clutch element out of engagement with each other; a rotatable cam device carried by said housing including means for moving said clutch member and said clutch element into engagement with each other and for limiting the movement of said member and said element away from each other; means for rotating said cam device; and means disposed exteriorly of said housing and coacting with said housing independently of said cam device to adjust the position of said element relative to said cam device to thereby adjust the position of said member relative to said element in said disengaged position.

8. In a clutch mechanism including a pair of clutch members mounted for movement relative to each other between an engaged and a disengaged position, the combination of: a clutch operator mounted for sliding movement into engagement with said members for moving said members into said engaged position; a rotatable cam device for sliding said operator; stop means carried by said operator; and elongated recess means in said cam device for receiving said stop means, said recess means being so disposed as to cause engagement between an end thereof and said stop means when said cam device is rotated to a position corresponding to said disengaged position of said clutch mechanism.

9. In a clutch mechanism including a rotatable shaft secured in a housing against axial movement, a clutch member secured to said shaft, and a coacting clutch member slidably mounted on said shaft for movement between an engaged and a disengaged position, the combination of: a clutch operator mounted for sliding movement into engagement with said slidable member for moving said members into said engaged position; a rotatable cam device for sliding said operator; means mounting said cam device in said housing independently of said shaft for rotation about an axis disposed transversely of and intersecting said shaft intermediately of the ends thereof; stop means carried by said operator; and elongated aperture means in said cam device for receiving said shaft means and said stop means to permit rotation of said cam device, said aperture means being so disposed as to cause engagement between an end thereof and said stop means when said cam device is rotated to a position corresponding to said disengaged position of said clutch mechanism.

10. In a clutch mechanism including a rotatable shaft secured in a housing against axial movement, a clutch member secured to said shaft, and another coacting clutch member slidably mounted on said shaft for movement between an engaged and a disengaged position, the combination of: a rotatable cam device for moving said members into said engaged position; means mounting said cam device in said housing independently of said shaft for rotation about an axis disposed transversely of and intersecting said shaft intermediately of the ends thereof;
and an opening through said cam device for passing said shaft to permit rotation of said cam device.

11. In a clutch mechanism including a rotatable shaft secured in a housing against axial movement, a clutch member secured to said shaft, and another coacting clutch member slidably mounted on said shaft for movement between an engaged and a disengaged position, the combination of: a clutch operator disposed coaxially with said shaft and slidably supported in said housing independently of said shaft for moving said slidable member into said engaged position; and a rotatable cam device supported in said housing independently of said shaft for sliding said clutch operator.

12. In a clutch mechanism including a rotatable shaft secured in a housing, a clutch element secured to said shaft, and a clutch member slidably mounted on said shaft for movement between an engaged and a disengaged position relative to said clutch element, the combination of: a rotatable cam device carried in said housing including means for moving said slidable member into engagement with said element and for limiting the movement of said member away from said element; and means inter-engaging said shaft means and said housing for adjusting the axial position of said shaft means to control the position of said element relative to said cam device to thereby adjust the position of said element relative to said member in their disengaged position.

13. In a clutch mechanism including a rotatable shaft secured in a housing against axial movement, a clutch member secured to said shaft, and another coacting clutch member slidably mounted on said shaft for movement between an engaged and a disengaged position, the combination of: a clutch operator disposed coaxially with said shaft and slidably supported in said housing independently of said shaft for moving said slidable member into said engaged position; a rotatable cam device supported in said housing independently of said shaft; and a camming surface carried by said cam device in a position engaging said clutch operator and comprising a cylindrical surface eccentrically disposed relative to the axis of rotation of said cam device.

GLYNN H. WILLIAMS.